Figure 1:
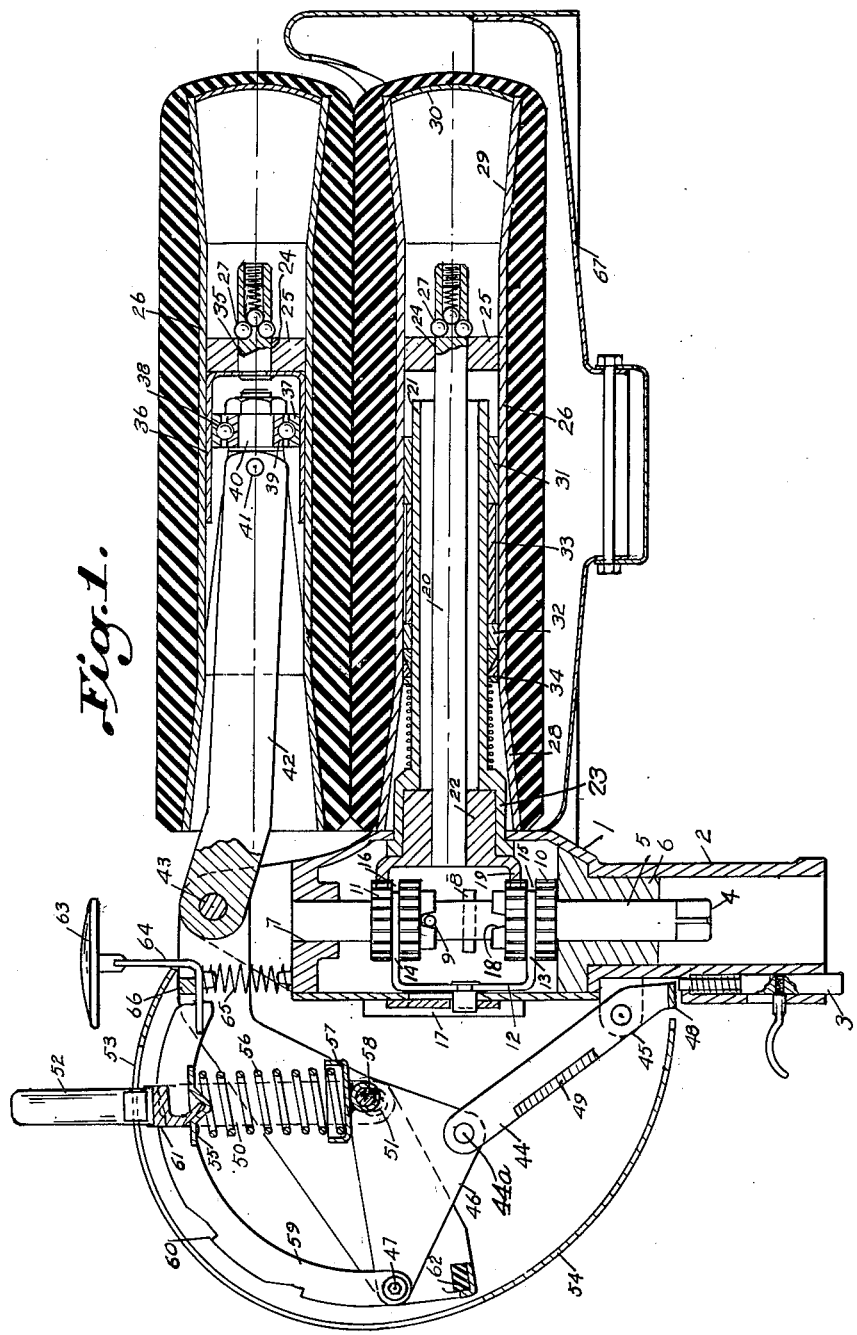

March 4, 1952 — W. L. KAUFFMAN, II — 2,587,627
WRINGER

Filed Dec. 26, 1944 — 3 Sheets-Sheet 1

INVENTOR.
Walter L. Kauffman II
BY Ralph Hammer
ATTORNEY.

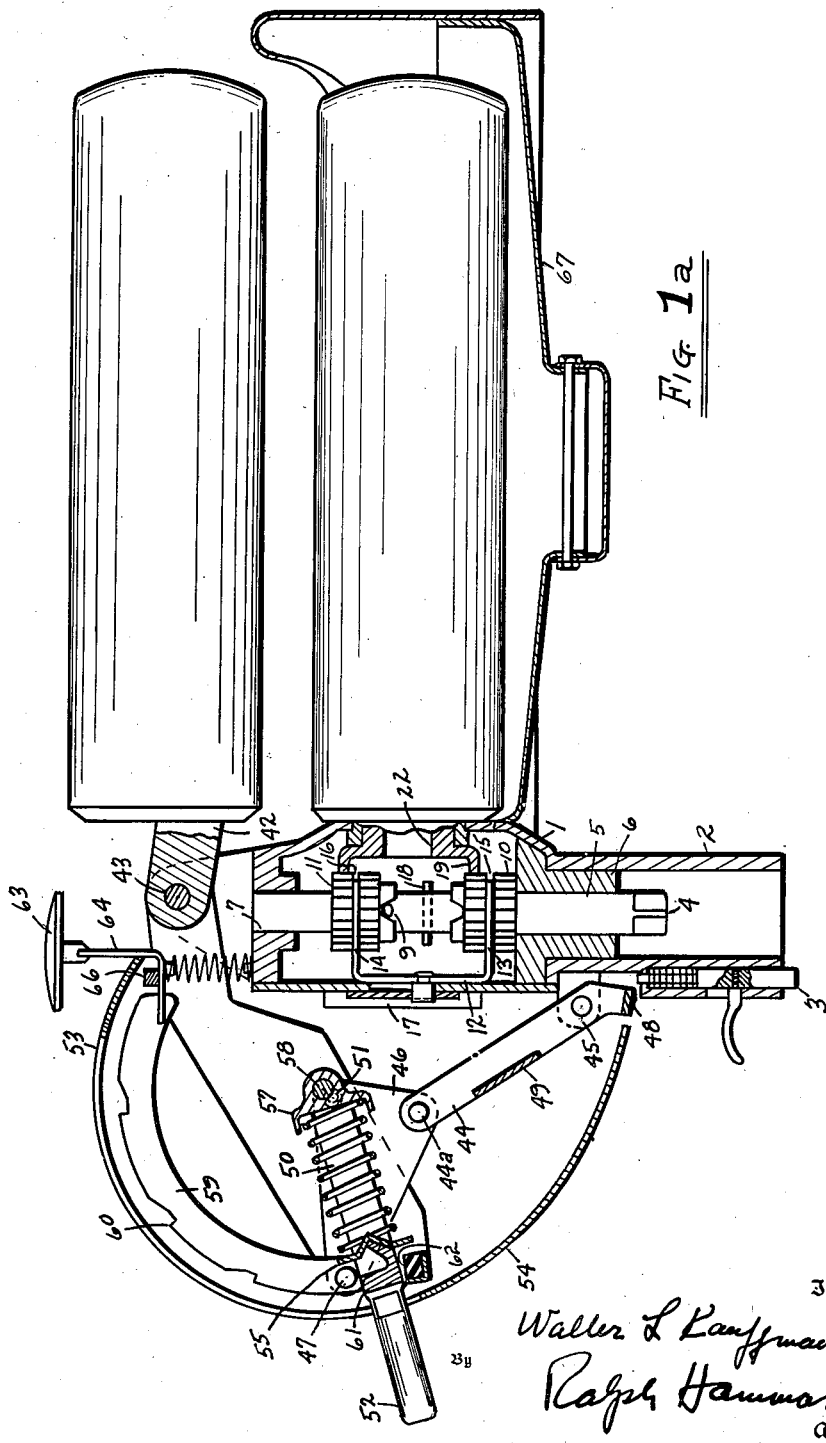

March 4, 1952   W. L. KAUFFMAN, II   2,587,627
WRINGER
Filed Dec. 26, 1944   3 Sheets-Sheet 3
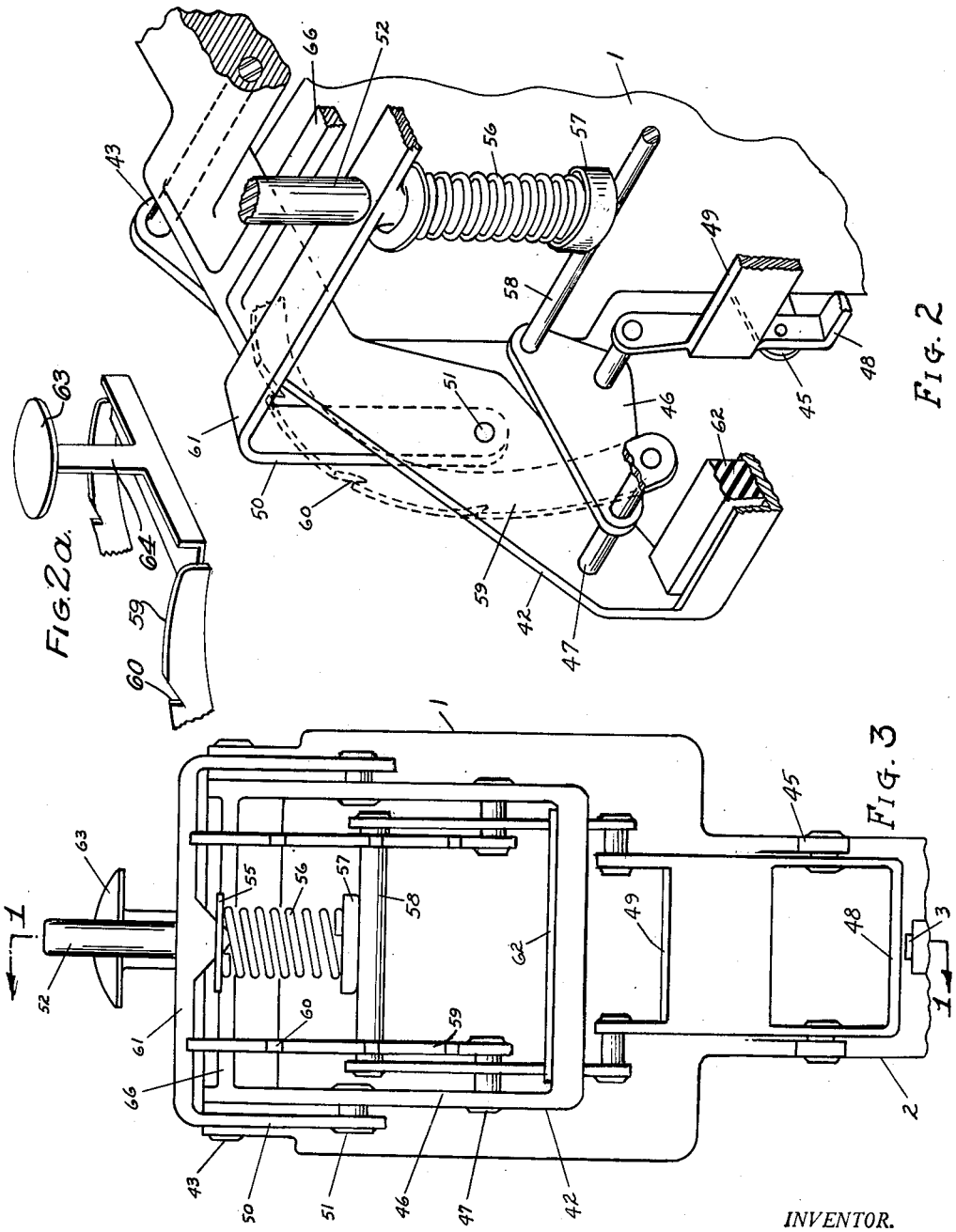
INVENTOR.
BY Walter L. Kauffman II Patented Mar. 4, 1952

2,587,627

UNITED STATES PATENT OFFICE 2,587,627

WRINGER

Walter L. Kauffman, II, Erie, Pa., assignor to Lovell Manufacturing Company, Erie, Pa., a corporation of Pennsylvania Application December 26, 1944, Serial No. 569,769

11 Claims. (Cl. 68—249)

1

The present invention relates to clothes wringers.

The object of my invention is to provide a wringer having rolls supported at one end and open at the other end and to provide a roll pressure mechanism having a toggle and a pair of links and in which the roll pressure is applied and released by shifting the line of action of a spring forming a part thereof. Further objects and advantages will be pointed out in the specification and claims.

In the accompanying drawings, Fig. 1 is a side elevation, partly in section on line 1—1 of Fig. 3, of a wringer in the pressure or wringing position, Fig. 1a is a similar view with a wringer in the released position, Fig. 2 is a fragmentary perspective with the parts displaced and somewhat distorted to show the construction of the wringer, and with the pressure release latch broken away and having the broken away portion indicated in dotted lines, Fig. 2a is a fragmentary perspective of the safety release latch, and Fig. 3 is an end view of the wringer with the cover removed to expose the mechanism.

Referring to the drawing, there is shown a wringer having a head 1 with a depending tubular sleeve 2 for mounting on the wringer post of a domestic washing machine. In the lower end of the sleeve is an index pin or locking device 3 for locking the head in the desired angular position on the wringer post. When the head is mounted on the wringer post, the wringer drive shaft engages a coupling 4 at the lower end of a shaft 5 journalled in bearings 6 and 7 and carrying clutch pins 8 and 9 for engagement with reversing gears 10 and 11. The reversing gears are loose on the shaft 5 and are slidable along the shaft by a carrier 12 having forked ends 13 and 14 which respectively engage grooves 15 and 16 in the gears 10 and 11. The carrier is fastened to a slide 17 which is raised and lowered by suitable mechanism (not shown) to move the clutch teeth 18 on the gears into engagement with one or the other of the clutch pins. The spacing between clutch pins is such that in an intermediate position of the slide neither of the clutch pins engages the corresponding gear.

The gears 10 and 11 are continuously meshed with a crown gear 19 fixed to a roll drive shaft 20 projecting through a tube 21 fixed in the side wall of the wringer head. The crown gear has a hub 22 received in a bearing 23 at the head end of the tube. The roll shaft 20 extends beyond the outer end of the tube 21 and has a squared portion 24 fitting into a square opening

2 in a collar 25 fixed to a tube 26 on which the rubber for the lower roll is molded. The outer end of the shaft 20 carries a ball detent 27 which releasably holds the roll on the shaft so that it can be removed by an endwise pull.

The tube 26 has outwardly flaring portions 28 and 29 at the inner and outer ends which decrease the amount of rubber required at the ends of the rolls. At the outer end the roll is closed by a cap 30 over which the rubber is molded. The roll is journalled on the tube 21 by bearings 31, 32 fixed to the tube and located thereon by a spacer 33. At the inner end of the bearing 32 is a water seal 34. The upper roll is of the same construction as the lower roll and is removably carried on a stub shaft 35 fixed to a sleeve 36 slidably received within the roll tube 26. The squared portion 24, the collar 25 and detent 27 are of the same construction as that used for the lower roll. In the sleeve 36 is fixed the outer raceway 37 of a ball bearing 38 having its inner raceway 39 bolted to a member 40 pivoted at 41 on the inner end of a pressure arm 42. The pressure arm or member 42 is pivoted at 43 on the upper end of the driving head and the roll pressure is applied and released by pivoting of the pressure member.

Due to the change in angle of the pressure member, some equalization of the roll pressure along the length of the rolls is necessary. In the present construction this is provided by the pivot 41 at the inner end of the pressure arm which provides a tiltable support for the upper roll permitting equalization of the pressure throughout the length of the rolls.

It will be noted that both the upper and lower rolls are supported solely by the drive head and that the outer ends of the rolls are open. When the pressure between the rolls is released, clothing may be removed from between the rolls by sliding off the outer ends of the rolls.

The roll pressure is applied through a toggle having a link 44 pivoted between ears 45 at the lower end of the drive head and a link 46 pivoted on a pin 47 on the outer end of the pressure arm 42. In the pressure applying position the toggle links 44 and 46 are short of an in line position in that the common pivot 44a lies above a center line connecting the parts 45, 47 and a flange 48 at the lower end of the link 44 is positioned above the upper end of the index pin 3 preventing operation of the index pin to change the wringer position while the pressure is applied. When the roll pressure is released, the lower toggle link is swung up toward the drive head shown in Fig.

1a and if the rolls are still further separated the lower toggle link will swing against the drive head to a position limited by a stop 49 on the link.

The toggle is moved to and from pressure applying position by pressure mechanism consisting of a link 50 pivoted at 51 on the pressure arm 42 and having a handle 52 projecting through a slot 53 in a cover 54. At the free end of the link 50 is a seat 55 for a compression spring 56 having its lower end received in a seat 57 pivoted at 58 on the toggle link 46. The link 50 and the spring 56 comprise a pair of links in which the pressure exerted by the spring is a maximum when the link and spring lie along a center line connecting the pivots 51 and 58. In the present construction it is not possible for the link and spring to reach this position and at all positions of the link permitted by the length of the slot 53, the spring 56 tends to rotate the link 50 in a counter-clockwise direction. This rotation of the link is normally prevented by an arcuate safety release latch member 59 having notches 60 which cooperate with a shoulder 61 on the link 50 and hold the link in position. The link is shown in Fig. 1 in the maximum pressure position, the position in which the moment of the force exerted by the spring 56 on the toggle link 46 is a maximum. In Fig. 1a, the parts are shown in the pressure release position and the upper roll can be further lifted if additional roll separation is desired. As shown in Figs. 2 and 3, the links 44, 46, 50 and the latch 59 have duplicate portions at each side of the wringer head which are rigidly connected and function as a unit. As the link is turned in a counter-clockwise direction to engage progressively lower notches on the latch member, the moment of the spring force on the toggle link 46 decreases and the roll pressure is correspondingly decreased.

In the lower pressure positions not only is the roll pressure decreased, but the rate of increase of roll pressure with roll separation is also decreased. As the link 50 is moved to a position in which the line of action of the spring lies along a center line connecting the pivots 47 and 58, the moment on the toggle link becomes zero and the roll pressure is completely released. By moving the link slightly below this position, the moment of the spring on the toggle link 46 tends to rotate the link in the direction to lift the upper roll away from the lower roll. Since only a slight lifting force on the upper roll is needed or is desirable, the lowermost position of the link 50 is limited by a stop 62.

In the use of the wringer, the roll pressure is applied by moving the handle 52 in a clockwise direction until the shoulder 61 is opposite or slightly beyond the notch 60 corresponding to the desired roll pressure. Upon releasing the handle, the link is pivoted in a counter-clockwise direction by the force of the spring 56 to a position in which the shoulder 61 engages the proper notch. The roll pressure is safety released by a button 63 at the upper end of an angular rod 64 fixed to the upper end of the latch member 59 and biased upward by a spring 65 against a stop 66. By depressing the button 63 the safety release latch member 59 is moved clear of the shoulder 61 and the link 50 is pivoted in a counter-clockwise direction to the pressure released position by the spring 56. Because of the mechanical advantage attained through the use of a toggle to apply the roll pressure, the roll pressure is easily applied and since all of the parts are pivotally connected at all times, the resetting of the roll pressure is simplified. The same movement of the handle 52 which resets the pressure also resets the safety release latch 59.

The wringer is provided with a suitable drain board structure 67 which is fastened in a manner not shown to the drive head adjacent the inner end of the lower roll. When the drain board structure is removed, the upper and lower rolls may be pulled off the roll shafts.

What I claim as new is:

1. In a wringer, a head, means for mounting the head for swinging movement on a wringer post, roll drive gearing in the head, a roll support extending from the gearing from the head and having a free end, a hollow roll journaled on the support, a roll drive shaft extending through the support and having a roll driving connection beyond the free end of the support, a second support pivoted on the head on an axis transverse to the roll axis, a tiltable roll support on said second support, and roll pressure mechanism on the head for pivoting the second support.

2. In a wringer, a frame, a roll, a pressure member for said roll, a toggle comprising links pivoted to each other and respectively to said frame and to said member and arranged to apply pressure as the links approach an in line position, a pressure link pivoted on the roll pressure member at a point spaced from the end of one of the toggle links and swingable between a position extending along said one toggle link to a position transverse to said one toggle link, and a spring arranged between the pressure link and said one of the toggle links and constrained to pivot with the pressure link whereby the angular position of the pressure link changes the pressure moment exerted on the toggle link.

3. In a wringer, a roll, a pressure device for said roll comprising toggled links movable toward an in line position to apply pressure, a pressure link swingable about a pivot spaced from the end of one of the toggle links between a position extending along said one toggle link to a position transverse to said one toggle link, and a spring arranged between the pressure link and one of the toggle links and extending along and constrained to swing with the pressure link whereby the pressure moment exerted on the toggle link varies with the position of the pressure link.

4. In a wringer, a roll, a pressure device for said roll comprising toggled links movable toward an in line position to apply pressure, a pivoted pressure link swingable about a pivot spaced from the end of one of the toggle links between a position extending along said one toggle link to a position transverse to said one toggle link, and a spring arranged between the free end of the pressure link and one of the toggle links and constrained to swing with the pressure link for exerting a pressure moment on said one toggle link dependent upon the angular position of the pressure link.

5. In a wringer, a frame, a pressure arm pivoted on the frame, toggle links respectively pivoted on the frame and on said arm and movable toward an in line position to apply pressure to the arm, an index locking device on the frame, and an extension on one of the toggle links movable to lock the index locking device in the pressure applying position of the toggle links.

6. In a wringer, cooperating rolls, a roll supporting frame at one end of the rolls, the other end of the rolls being free and overhanging the frame, pressure means on said frame for moving the rolls together, a latch holding the pressure means in a pressure position, and safety release means for releasing the latch.

7. In a wringer, a roll carrying frame, roll pressure mechanism having toggle links movable toward an in line position to apply pressure, one of the links being pivoted on the frame, an index locking device, and an interlock between the index locking device and said one link for locking the index locking device in the pressure applying position of the link.

8. In a wringer, hollow rolls, a drive head, means for mounting the head for swinging movement on a wringer post, a roll support extending from the head into one of the rolls, a roll support pivoted on the head on an axis transverse to the roll axis and extending into the other roll, a tiltable roll supporting means on one of the roll supports intermediate the ends of the roll, and roll pressure mechanism acting on the pivoted support.

9. In a wringer, a frame, a roll, a pressure member for said roll, a toggle comprising links pivoted to each other and respectively to said frame and to said member and arranged to apply pressure as the links approach an in line position, a pair of links one of which includes a spring, said pair of links being connected to each other and extending from the common connection toward adjacent pivots, one of which is on one of said toggle links and the other of which is on the roll pressure member, and means for varying the angular position of said pair of links to vary the pressure moment exerted on said one of the first toggle links.

10. In a wringer, a roll, a pressure device for said roll comprising a toggle having links movable toward an in line position to apply pressure, and a pair of links pivotally connected to each other, one of which includes a spring, said links of the pair extending from their pivotal connection in the same direction to points substantially in alignment, said points of alignment being the axes of pivots in spaced relation, one of said latter pivots being a pivot on a link of the toggle, the other of the latter pivots being a pivot on one of links of the pair of links, and means on one of the pair of links for swinging the pair of links about the other of the latter pivots to vary the roll pressure, the one of the links of the pair of links having as a bearing therefore a pressure member.

11. In a wringer, a roll pressure member, pressure mechanism including a pair of links, one of the pair of links being pivoted on the roll pressure member, the other of the pair of links including a spring arranged between the free end of said one link and extending toward a pivot adjacent and spaced from the pivot on the roll pressure member, a pressure member connected to one of the link pivots and pivoted on the roll pressure member at a point spaced to one side of the link pivots, the link pivots being arranged so the spring tends to pivot said one link toward the pressure member pivot and thereby decrease the pressure on said roll pressure member, and latch means biased into engagement with said one link for retaining said one link in the pressure applying position.

WALTER L. KAUFFMAN, II.

REFERENCES CITED

The following references are of record in the file of this patent:

UNITED STATES PATENTS

| Number | Name | Date |
| --- | --- | --- |
| 9,127 | Albrecht | Mar. 23, 1860 |
| 61,018 | Palmer | Jan. 8, 1867 |
| 98,566 | Cooper | Jan. 4, 1870 |
| 1,208,339 | Lewis | Dec. 12, 1916 |
| 1,220,620 | Freeman | Mar. 27, 1917 |
| 1,416,213 | Kincaid | May 16, 1922 |
| 1,557,828 | Gould | Oct. 20, 1925 |
| 1,601,362 | Howe | Sept. 28, 1926 |
| 1,652,424 | Carmeto | Dec. 13, 1927 |
| 1,792,879 | Weiss | Feb. 17, 1931 |
| 1,817,603 | Behan | Aug. 4, 1931 |
| 1,841,057 | Roberts | Jan. 12, 1932 |
| 2,094,164 | Zeman | Sept. 28, 1937 |
| 2,179,715 | Davis et al. | Nov. 14, 1939 |
| 2,206,301 | Dunn | Jan. 2, 1940 |
| 2,217,376 | Montgomery et al. | Oct. 8, 1940 |
| 2,218,096 | Reinitz | Oct. 15, 1940 |
| 2,228,853 | Skinner | Jan. 15, 1941 |
| 2,268,829 | Kauffman | Jan. 6, 1942 |
| 2,360,369 | Schroeder | Oct. 7, 1944 |